Aug. 6, 1957 F. MALSCH 2,802,128
TUNING INDICATOR VALVE
Filed June 21, 1952

INVENTOR.
Friedrich Malsch
BY
Attorney

United States Patent Office 2,802,128
Patented Aug. 6, 1957

2,802,128
TUNING INDICATOR VALVE

Friedrich Malsch, Esslingen-Waldenbronn, Germany, assignor to International Standard Electric Corporation, New York, N. Y., a corporation of Delaware Application June 21, 1952, Serial No. 294,938

5 Claims. (Cl. 313—107.5)

The present invention relates to voltage indicator valves such as for example as are used in tuning and referred to frequently as "Magic Eye Tubes."

Known tuning indicator valves contain an indicating system and an amplifier system in the same bulb or envelope. The indicating system is arranged above the amplifier system. The luminous screen is viewed from the top of the bulb.

In indicating valves in which one surface of the luminous screen is swept by the movement of an electron beam originating from a long, preferably hollow-cylindric cathode, the distance to the perimeter of the luminous screen from the cathode represents a measure of the appreciable sensitivity of the indicating valve. The greater this distance the further the beam travels along the outer perimeter of the screen for any given angular deflection of the beam. Increasing the distance to the perimeter thus increases the appreciable sensitivity of a given device. In known indicating devices of this kind, the observable sensitivity was restricted because the luminous screen had to be somewhat smaller than the bulb diameter, since the observation of the luminous screen had to take place through the top of the bulb. According to one aspect of the present invention an eccentric arrangement of the electrode system is provided to increase said distance and the observation sensitivity. According to one aspect of the present invention the observation sensitivity of indicating devices of the said kind is increased by arranging the indicating system not parallel to the bulb axis, but at an angle, so that the width of the luminous screen corresponds to the bulb diameter, whilst the length is larger. The indicating system is arranged in the bulb in such a manner that the cathode axis of the indicating and amplifier system forms together with the bulb axis an angle which is larger than 30°, preferably 90°. This arrangement of the beam-generating and deflecting system advantageously allows building tuning indicator valves of smaller diameter (miniature valves) with at least the same sensitivity as with systems known up to now. The viewing of the luminous screen then will be done through the cylindrical surface of the bulb. For the purpose of improving the optical visibility, this surface may exhibit a shape suitable therefor, deviating from the cylindrical shape. Furthermore the valve may contain in the same bulb the indicating system and the amplifier system, just like with valves of a similar construction. In the usual manner the amplifier system may be arranged coaxially with the beam generating system of the indicating part, whereby the same cathode will be employed. Owing to the fact that in this arrangement of the system, only a short cathode length is practical in the bulb, it may be of advantage to give a larger cross-section to the cathode part of the amplifier system than to the cathode part of the indicating system. In employing indicating valves of such eccentric construction of the beam generating system, it is furthermore possible to utilize that cathode part of the indicating system, which is not being used for amplifier purposes. The shape of the luminous screen may be widely adjusted to the requirements. Experience has shown that a fan-shaped electron beam may be controlled on a length of 20 mm. and more with sharp limiting lines at the operating voltages which are customary for tuning indicator valves. Therefore it is convenient to make the luminous screen, not circular, as heretofore, but to give it a shape in which the length is considerably larger than the width. By suitable dimensioning within the amplifier system, one is enabled to influence the sensitivity of the angular control so that the desired tuning sensitivity distribution will be achieved over the entire tuning range. Furthermore it is possible to obtain a great reading accuracy by a suitable design of the luminous screen-limiting line at the outer perimeter of the screen.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
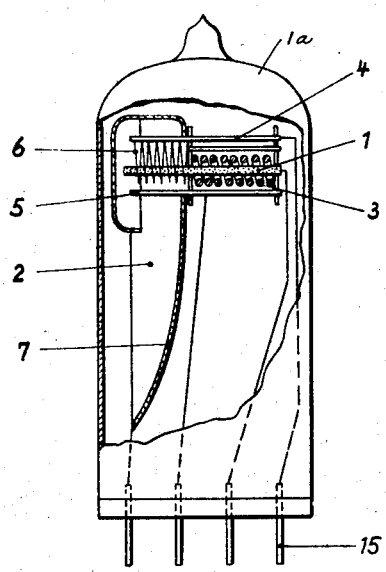
Fig. 1 is a schematic sectional side view of a tuning indicator valve.
Figure 2:
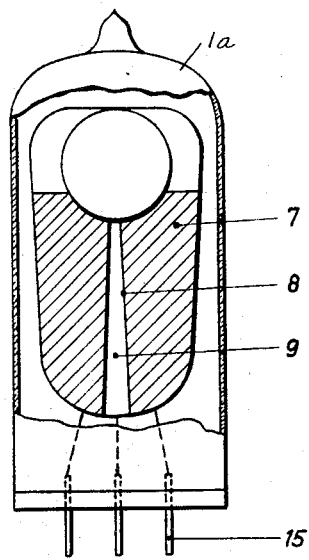
Fig. 2 is a representation of the illumination of the screen of Fig. 1.
Figure 3:
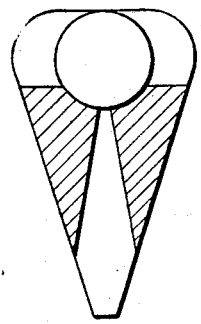
Fig. 3 is a variant of the luminous screen of Fig. 2.

Referring now to Figs. 1 and 2, cathode 1 is arranged perpendicular to the longitudinal axis of the bulb envelope 1a and serves as an electron source in the indicating system 2 and in the amplifier system 3. Anode 4 in the amplifier system is connected to the deflecting prop 5 in the indicating system. The cathode in the indicating system is surrounded in known manner by grid 6. Luminous screen 7, which is the anode of the indicating system, looking at it in front view, has the shape of a shield, so that the length of the electron beam 8 is very large at a nearly closed shadow angle 9, preferably larger than the bulb diameter. The anode has an extended dished surface with a generally planar opening and is coated on its inner surface with fluorescent material excitable by electrons. The pins in the stem press are denoted by 15. Fig. 1 merely shows some of these pins, which are connected to the respective electrodes—as is schematically pointed out by dash lines—in the conventional manner conductively and rigidly. The remaining lead-in wires and pins are not represented in Fig. 1. The indicating and amplifier system is supported by the lead-in wires arranged between the electrodes and the pins. The shape of the luminous screen edge may also proceed pointedly downwards, as shown in Fig. 3.

Therewith, a high reading accuracy is obtained near the center line of the screen.

Figure 4:
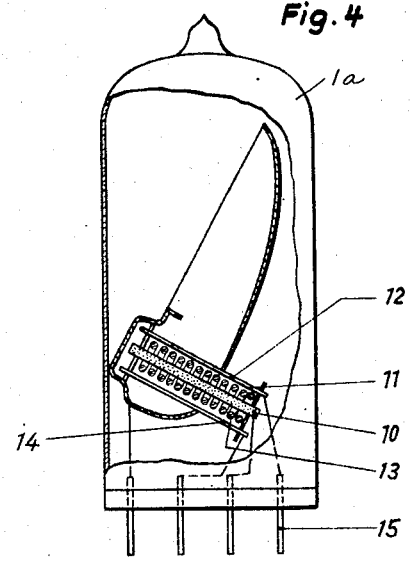
Fig. 4 is a view similar to Fig. 1 of a modified embodiment of the present invention.

Fig. 4 illustrates another embodiment. The beam generating and deflection system and the amplifier system use the common cathode 10. Grid 11, which is drawn above the cathode, belongs to the indicating system and controls the formation of a space charge around the cathode in a known manner. The deflecting prop 12 is connected to anode 14 of the amplifier system, which is drawn below the cathode. Grid 13 of the amplifier system is located between cathode and anode 14. The pins in the stem press are denoted by 15. Fig. 4 merely shows some of these pins, which are connected to the respective electrodes—as is schematically pointed out by dash-lines—in the conventional manner conductively and rigidly. The remaining lead-in wires and pins are not represented in Fig. 4. The indicating and amplifier system is supported by the lead-in wires arranged between the electrodes and the pins. The arrangement of the entire system may be chosen thus, that the cathode is directed parallel or obliquely towards the stem press of the valve. This arrangement offers the advantage, if enabling using an especially short cathode.

Figure 5:
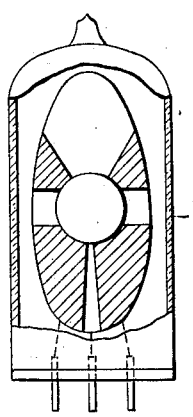
Fig. 5 is a view similar to Fig. 2 of a modification of the screen display.

Besides these above mentioned examples of embodiment of course also other known indicating systems may be placed in the bulb of the valve in the same manner. With tuning indicator valves, having two ranges of sensitivity, the cathode is conveniently arranged in about half the heights of the bulb and the luminous screen is stretched to both sides, as may be seen from Fig. 5.

While I have described above the principles of my invention in connection with specific apparatus, it is to be clearly understood that this description is made only by way of example and not as a limitation to the scope of my invention.

What is claimed is:

1. An optical indicating tube comprising an elongated envelope having a top portion and side walls, a cathode within said envelope, an anode having a generally planar opening and covered with fluorescent material mounted in said envelope adjacent said cathode to receive electrons from said cathode to excite said material and having a greater length than its width, and control means mounted adjacent said cathode for controlling the electrons emitted therefrom, said cathode positioned with its longitudinal axis extending substantially at right angles to the plane of the anode opening and at an angle to the logitudinal axis of the envelope not greater than 60°.

2. An optical indicating tube for electric voltages comprising an elongated envelope, an elongated cathode extending in a direction making an angle of at least 30° with the lengthwise axis of said envelope, a dished anode having an extended surface and a generally planar opening and coated on its inner surface with a fluorescent material excitable into fluorescence by electrons from said cathode, said anode mounted with its planar opening at substantially right angles to the longitudinal axis of said cathode and control means mounted adjacent said cathode for controlling the electrons emitted therefrom.

3. Optical indicating tube for electric voltages according to claim 2, wherein the width of the luminous screen approximately equals the bulb diameter, the length thereof being considerably larger than said width.

4. An optical indicating tube comprising an elongated envelope, an elongated cathode mounted within said envelope, an elongated dished-out anode having a generally planar opening and having its inner surface covered with fluorescent material mounted adjacent said cathode to receive electrons from said cathode to excite said material, said cathode mounted in said envelope with its longitudinal axis extending at substantially right angles to the plane of said anode, said anode opening being mounted with the fluorescent material thereon facing the side wall of said envelope for observation therethrough, and control means positioned adjacent said cathode.

5. A tube according to claim 4 wherein said cathode is mounted adjacent one end of said anode.

References Cited in the file of this patent
UNITED STATES PATENTS

| | | |
|---|---|---|
| 1,994,726 | Orth | Mar. 19, 1935 |
| 2,108,880 | Braden | Feb. 22, 1938 |
| 2,513,908 | Bailey | July 4, 1950 |
| 2,594,025 | Jacobi | Apr. 22, 1952 |

FOREIGN PATENTS

| | | |
|---|---|---|
| 443,602 | Great Britain | Mar. 3, 1936 |